3,032,511
POLYMER CATALYSTS
Arthur W. Langer, Jr., Plainfield, and Erik Tornqvist, Westfield, N.J., assignors to Esso Research and Engineering Company, a corporation of Delaware
No Drawing. Filed Dec. 11, 1959, Ser. No. 858,861
9 Claims. (Cl. 252—429)

The present invention relates to the preparation of polymers and the catalysts used to prepare them. Specifically it concerns catalysts which polymerize olefins, especially alpha olefins.

This application is a continuation-in-part of Serial No. 629,488, filed December 20, 1956 and now abandoned.

It is known that olefins, such as ethylene, propylene, etc. can be polymerized at relatively low pressures by using various combinations of aluminum compounds and reducible heavy metal compounds, e.g. titanium, zirconium and iron. Among the most active types of catalyst for this reaction are combinations of trialkyl aluminum or dialkyl aluminum halide with a titanium tetrahalide. For instance, excellent results are obtained by using combinations of triethyl aluminum or diethyl aluminum chloride with titanium tetrachloride, made by simply mixing the catalyst components at atmospheric temperature in suitable solvents. These catalysts have been found to afford high yields of high molecular weight, solid polymers, especially with monomers, such as ethylene and propylene, as well as other olefins, even at pressures as low as atmospheric.

These catalysts may be prepared by reacting an aluminum compound with a heavy metal compound at a temperature between about 20 and 90° C. Generally the product is a brown, amorphous catalyst which is unstable and tends to make a less crystalline polymer when activated with additional aluminum compound. If it is desired to make a highly crystalline polymer, for instance an isotactic polypropylene, the catalyst should have a crystalline structure. In the case of titanium, the crystalline titanium trichloride is identified by its purple or violet color and its characteristic X-ray diffraction pattern, which is different from the pattern given for the alpha form previously known. While it is known in the art that the alpha form of purple crystalline titanium trichloride may be prepared by reacting titanium tetrachloride with titanium at a temperature between about 400 and 500° C. under a pressure of about 10 to 50 atmospheres, or by reacting the tetrachloride with hydrogen in the presence of a glowing tungsten filament, there is no known method for preparing the instant crystalline form using organometallic compounds, e.g. aluminum triethyl, as the reducing agent.

It has now been discovered that highly crystalline polymerization catalysts, as well as catalysts of intermediate crystallinity, may be prepared at relatively low temperatures by reacting a metallic reducing compound with a reducible heavy metal compound under critical conditions which are hereinafter disclosed.

In practicing one embodiment of the present invention the theoretical amount of a reducing organo-metallic compound, such as aluminum trialkyl, is reacted in a suitable inert diluent with a reducible heavy metal compound, such as those found in groups IV to VI and VIII of the periodic system, at a temperature above about 100° C. but less than about 300° C. for from a few minutes, e.g. about 5 minutes, up to about 20 hours. The reaction product may then be activated with additional organo-metallic at a lower temperature, that is between about 0 and 100° C. The resulting catalyst is either completely or partially crystalline and, depending upon the severity of the pretreatment, forms at least partially isotactic polymers with alpha olefins, such as propylene, and in most instances polymers which are highly isotactic.

The reaction conditions should be chosen so that a catalyst of the desired degree of crystallinity is obtained. This is preferably achieved by pretreating at a temperature between about 120 and 200° C. and, in the case of titanium halides and aluminum alkyls, the best results are obtained at temperatures between about 135 and 175° C., the optimum temperature being dependent of reaction time, concentration of reactants and type of solvent employed. The time required for the reaction is preferably between about 20 minutes and 2 hours.

Generally the reaction is run in a liquid medium, especially when one reactant is a solid at reaction temperature. However, when both reactants are liquids or gases, the pure compounds may be mixed in any suitable manner which will allow convenient handling and recovery of the solid, reduced, heavy metal compound. For example, either gaseous or atomized liquid aluminum triethyl may be reacted with hot vapors of titanium tetrachloride by intimately mixing them in the presence or absence of an inert gaseous diluent. In this embodiment the crystalline $TiCl_3$ product is handled and recovered conveniently as fluidized solid.

When the reaction is carried out in the liquid phase an inert liquid diluent is preferred. Excellent results have been obtained using paraffins, isoparaffins, naphthenes and mixtures thereof, although in many instances aromatics, halogenated paraffins, halogenated aromatics, perfluoro compounds and various other diluents may be used provided they do not react chemically with either catalyst component or with the final catalyst product. The boiling point of the diluent is not critical as long as liquid phase can be obtained by means of elevated pressure. For example, n-heptane has been used at temperatures above its boiling point under suitable pressures to maintain a liquid phase, whereas decane was found to be satisfactory at atmospheric pressure up to about 150° C. Higher boiling diluents have been used successfully at even higher temperatures and atmospheric pressures. The concentration of the reactants should be between about 5 to 100 grams/liter of diluent, preferably about 10 to 50 grams/liter.

Because these catalysts are easily poisoned, the crystalline catalyst intermediate should be prepared under an inert atmosphere, such as dry nitrogen. Other suitable inert materials include helium, argon, hydrogen and hydrocarbons such as methane and ethane.

The mol ratio of reactants in the pretreatment stage should be such that the reducible compound is reduced to the next lower level, e.g. $TiCl_4$ to $TiCl_3$, with preferably the stoichiometric amount of reducing agent based on the maximum theoretical reducing capacity of the latter. If an excess of reducing agent is used, the product will be over-reduced and result in an unstable amorphous form which has a low activity and yields a less crystalline polymer. On the other hand, if too small an amount of reducing agent is employed, only a portion of the reducible substance will be in the desired stable form and the unreduced material will be susceptible to over-reduction during the polymerization. Thus the mol ratio of reducing agent/reducible compound must be very carefully controlled to meet these specific requirements. For example, conventional catalyst preparations employ ratios of 0.5/1 or higher of aluminum triethyl to titanium tetrachloride, whereas it has now been found that by using ratios of about 0.30 to 0.36/1, and preferably 0.33/1, over-reduction is avoided when pretreatment temperatures above about 100° C. are employed. Similarly when other metal alkyl compounds are used, such as aluminum ethyl dichloride and aluminum diethyl chloride, the stoichiometrical ratio of alkyl metal compound to TiCl$_4$, based on the maximum theoretical reducing capacity of the former compounds, should be employed. Previously, very weak reducing agents, such as aluminum ethyl dichloride were thought to be incapable of reducing TiCl$_4$ to produce an active catalyst. However, at temperatures above about 100° C. aluminum ethyl dichloride is capable of reducing TiCl$_4$ to TiCl$_3$ which can be used for the polymerization of alpha olefins, such as propylene, when activated with aluminum triethyl or aluminum diethyl chloride.

Whereas the minimum ratio of alkyl metal compound to TiCl$_4$ that can be advantageously used for the catalyst preparation is determined by the maximum reducing capacity of the alkyl metal with respect to the formation of TiCl$_3$, the corresponding maximum ratio is determined by the ability of the alkyl metal to further reduce TiCl$_3$ to TiCl$_2$. Thus the ratio of alkyl metal compound to reducible compound must be carefully adjusted so that after the desired reduction has taken place no alkyl metal compound is present which is capable of causing further reduction. For instance, aluminum diethyl chloride and aluminum ethyl dichloride will not reduce titanium trichloride at temperatures of below about 70 and 100° C., respectively. Their ability to accomplish this reduction increases, however, with increasing temperature. This means that at temperatures above 100° C. in the aluminum triethyl/titanium tetrachloride system, all three alkyl groups will be active in the reduction. Thus in this system it is critical to use a molar ratio of about 0.30/1 to 0.36/1. On the other hand, only one of the alkyl groups of aluminum triethyl is active when the reduction is carried out at room temperature. Under such conditions it is then desirable to mix an AlEt$_3$/TiCl$_4$ mole ratio of about 1/1. Obviously the optimum ratio is dependent upon the number of active alkyl groups and will vary with the number of such groups in the compounds used. For instance, in the case of an aluminum diethyl chloride/titanium tetrachloride system, or a zinc diethyl/titanium tetrachloride system, the mol ratio should be about 0.5 when the reduction is carried out at a temperature at which both of the alkyl groups are active. Similarly, the type of transition metal compound to be reduced may have an influence on the optimum ratio.

A large number of reducing compounds can be used to pretreat and activate the heavy metal compound. Among the most valuable are alkyl or aryl aluminum compounds, especially trialkyl aluminum compounds, such as triethyl aluminum, tripropyl aluminum, triisobutyl aluminum, triphenyl aluminum, etc. and dialkyl aluminum compounds such as diethyl aluminum halides, diethyl aluminum chloride in particular, dipropylhalides, diisobutyl halides, etc. However, as previously mentioned, monoalkyl aluminum compounds can also be used. Generally, in addition to trialkyl or triaryl aluminum, organo aluminum compounds carrying two or at least one hydrocarbon radical, as well as one or two electron attracting groups, such as halogen, alkoxy, organic nitrogen or sulfur groups, etc. may be used. Instead of the alkyl or aryl aluminum compounds, the corresponding hydrides or mixed hydrides of aluminum may be used.

Other suitable reducing materials include organo-metallic compounds of elements of the I, II and III groups of the periodic system as well as hydrides or mixtures of alkyl or aryl compounds and hydrides of these elements. In addition to this alkali and alkaline earth metals as well as certain other metals such as aluminum which have sufficient reactivity at the temperatures employed, may be used in the reduction. Whatever material is used for the reduction, it is important that the ratio between reducing agent and transition metal compound be adjusted so that over reduction or under reduction will be prevented.

Reducible heavy metal compounds suitable for the purposes of the invention include such inorganic compounds as the halides, oxy-halides, complex halides, oxides, hydroxides, and organic compounds such as alcoholates, acetates, benzoates, and acetyl acetonates of the transition metals of the IV, V, VI and VIII groups of the periodic system, e.g. titanium, zirconium, hafnium, thorium, uranium, vanadium, niobium, tantalum, chromium, molybdenum, tungsten and manganese, as well as iron and copper. The metal halides, particularly the chlorides, are generally preferred, titanium, vanadium, and zirconium being the most active of these metals. The following heavy metal compounds are readily reducible requiring only low activation temperatures: titanium tetrachloride, titanium tetrabromide, vanadium tetrachloride, zirconium tetrachloride, zirconium tetrabromide and zirconium acetylacetonate.

The reacting compounds may be mixed in an inert diluent at the temperature chosen for the pretreatment, or they may be mixed at a lower temperature where the chance of over reduction is lower. Under the latter conditions, the TiCl$_3$ first formed, is converted into the purple-violet crystalline form by raising the temperature to a sufficiently high level. For instance, suitable proportions of triethyl aluminum and titanium tetrachloride may be mixed in an aliphatic hydrocarbon solvent at about 60–80° C. or even as low as room temperature or lower. The precipitate of TiCl$_3$ formed is, upon heating in the diluent to about 135° C. or higher for a sufficiently long time, converted to the crystalline form.

The composition of the catalyst intermediate may vary according to the reactants and the reaction conditions. For instance where the heavy metal compound is a titanium halide and the reducing compound is an aluminum alkyl there may be between about 0.3 to 1 atom of aluminum per atom of titanium depending on the number of alkyls in the aluminum compound. To illustrate this, where an aluminum alkyl dichloride is used the atomic ratio of Al/Ti in the intermediate should be 1 to 1, where an aluminum dialkyl chloride is used it should be 0.5 to 1 and where an aluminum trialkyl is used it should be 0.33 to 1.

The catalysts so pretreated are activated, in the presence or absence of the alpha-olefin to be polymerized, by the addition of further amounts of alkyl metal compounds, trialkyl aluminum compounds in particular. The amount of alkyl metal needed for activation will depend upon the particular pretreated catalyst intermediate and the pressure used during the polymerization. If the polymerization pressure is approximately atmospheric, the greatest activation is obtained with trialkyl aluminum compounds, e.g. triethyl aluminum and tripropyl aluminum. The amount of trialkyl metal compound added should be such that, after it has reacted with compounds such as AlCl$_3$ to form the corresponding dialkylhalide, about one mol of unreacted trialkyl aluminum remains in the system for each mol of TiCl$_3$ in the pretreated catalyst. For instance, if a trialkyl aluminum is employed, both to reduce TiCl$_4$ and activate the catalyst intermediate, a total Al/Ti molar ratio of about 1.5 to 3.0, and preferably about 2.0, should be used.

The total molar ratio, including any aluminum compound used in the pretreatment step, of the aluminum alkyl compound to titanium halide in the catalyst has an influence on the molecular weight of the polymer obtained. In general the total Al/Ti ratio should be between about 1 and 12. The higher this ratio is, the higher will be the molecular weight of the polymer. In some instances it may be desirable to activate the catalyst with a different metal alkyl compound than was used to reduce the heavy metal compound.

The polymerization process may be carried out under conventional conditions used in the low pressure polymerization of olefins. These conditions depend somewhat on the specific olefin involved and on the type of polymer desired. Propylene is the preferred olefin although other olefins, such as ethylene, butylene, etc. may be used alone or in combination. In the case of propylene, the polymerization may be carried out by intimately contacting gaseous propylene with the catalyst, for example, by bubbling the propylene into a suspension of the catalyst in an inert solvent or diluent. Neither the polymerization temperature nor the polymerization pressure is particularly critical, but it is preferred to operate at temperatures of about 0° to 110° C., and especially between about 40° C. to 90° C.

Pressures ranging anywhere from subatmospheric to 250 atmospheres have been used heretofore. While this full pressure range may be employed with the catalysts of the present invention, atmospheric pressure has been found to be quite satisfactory for use with the present catalysts. Accordingly, an advantage of this invention is that generally the polymerization can be carried out at substantially lower pressures than are required to accomplish similar results with conventionally prepared catalysts. This is attributable to the high reactivity and other unique properties of these new catalysts.

The polymerization reaction is preferably carried out while stirring in batch or continuous operation. When operating batchwise, olefin introduction is continued until the catalyst is wholly or partially exhausted and the reaction starts to cease. In order to permit stirring even after the formation of substantial amounts of solid polymer, solvents or diluents may be used. These diluents, which should be liquid at the operating conditions, include aliphatic, hydroaromatic and aromatic hydrocarbons, such as pentane, hexane, heptane, higher paraffins, isoparaffins, cyclohexane, tetrahydronaphthalene, decahydronaphthalene, benzene, xylene, halogenated aromatic hydrocarbons, e.g. mono- or di-chlorobenzenes, and mixtures of these and other diluents. Sufficient pressure may be applied during the reaction to maintain the lower boiling diluents in a liquid state. The polymer concentration in the reaction mixture may reach 10 to 40 wt. percent, although lower concentrations can of course be used.

The amount of catalyst employed may vary within wide limits depending somewhat on the purity of the olefin feed. Proportions as small as 0.1 part by weight of catalyst per 1,000 parts by weight of olefin are sufficient if the feed is pure. With olefin feed streams containing up to about 0.01% of water, carbon dioxide or certain other oxygenated compounds, catalyst proportions of about 0.5 to 5 wt. percent are usually adequate.

Upon completion of the polymerization reaction, the catalyst may be completely deactivated, e.g., by the addition of an alcohol, such as isopropyl alcohol or n-butyl alcohol, in amounts of about 10 to 100 times the amount of catalyst used. The reaction slurry may then be filtered, the filter cake reslurried in a catalyst solvent, such as dry, concentrated alcohol at about 50° to 100° C. for 15 to 60 minutes, filtered again and the filter cake dried, preferably under reduced pressure. Ash residues in the polymer are reduced below about 0.05% by this procedure. If necessary, the ash content may be further reduced by aqueous acid treatment, etc. according to methods well known in the art, or by using chelating agents, such as acetylacetone.

The polymers produced according to the present invention have molecular weights in the range of about 100,000 to 300,000 or even as high as 3,000,000 as determined by the intrinsic viscosity method using the I. Harris Correlation (J. Polymer Science 8,361, 1952). They have a high degree of crystallinity and a low solubility in n-heptane.

The invention will be best understood by referring to the following experimental data and specific examples.

EXAMPLE I

The critical nature of the mol ratio of the reactants in the preparation of crystalline catalysts at temperatures between about 100 and 300° C. is shown by the following series of tests in which titanium tetrachloride and aluminum triethyl were reacted in pure n-decane 135° C. for 1 hour using Al/Ti ratios of 1.0, 0.5, and 0.33, respectively. Polymerizations were run with these catalysts in a batch reactor, using xylene as the diluent, at atmospheric pressure and temperatures between 60 and 100° C. In each case the Al/Ti mol ratio was adjusted to 2.0 for the polymerization reaction.

Table I

|  | Al/Ti mol ratio | | |
| --- | --- | --- | --- |
|  | 1.0 | 0.5 | 0.33 |
| Color of reduced titanium | Black | Dark brown | Purple-red. |
| Avg., polymerization rate, g./hr./g. | 2.0 | 3.0 | 24. |
| Max. absorption rate, cc./min | 50 | 80 | 600. |

It is evident that over reduction caused by the high Al/Ti ratios greatly decreases catalyst activity. The over reduction of titanium is shown by the dark color (TiCl$_2$ is black), whereas at a 0.33 ratio, the reduced titanium had a purple-red color which is indicative of crystalline TiCl$_3$. The 0.33/1 Al/Ti ratio under these pretreatment conditions results in complete conversion of TiCl$_4$ to TiCl$_3$ without over reduction. Furthermore, crystalline TiCl$_3$ is more stable than amorphous TiCl$_3$ toward further reduction and allows better reproducibility. By varying the temperature, time and concentration of the reactants, the rate of crystallization, the degree of crystallinity and the particle size of TiCl$_3$ can be varied to some extent. As will be shown in the following example, these variables affect polymer properties and catalyst activity.

EXAMPLE 2

Increased catalyst crystallinity may be obtained by increasing the pretreatment temperature, time and concentration of reactants, provided the stoichiometric ratio of reducing agent to heavy metal compound is used to prevent over reduction. In Table II below, data are given which show the effect of the pretreatment temperature on the titanium trichloride and the corresponding effects of the resulting catalyst on the polymer's properties. The reactants in each case were aluminum triethyl and titanium tetrachloride.

The increased crystallinity of TiCl$_3$ obtained by increasing the reaction temperature is illustrated by X-ray analysis and decreased surface area, as well as the purple color of the catalyst.

The analysis of the catalyst solids in Table II demonstrates the increasing reduction capacity of the triethyl aluminum with increasing temperature. Thus at temperatures below 135° C. only part of the aluminum from the triethyl compound is incorporated in the solid catalyst, whereas at 135° C. almost all aluminum is incorporated in the TiCl$_3$ catalyst as AlCl$_3$ indicating that all the ethyl groups have been active in the reduction. The high degree of crystallinity in the polypropylene runs D and E, is shown by the increased heptane insolubles, tensile strength and melting point, together with the decreased elongation. Polymers of this type are desirable in the field of flexible plastics, semi-rigid molded articles, pipes, etc.

The activity of the catalyst varies with method of preparation and the kind of diluent employed. As higher temperatures are used to prepare the TiCl$_3$ it becomes more crystalline and resistant to over reduction during the polymerization reaction. The advantages which can be derived by using two different diluents may be seen by comparing runs D and E, where with the same catalyst preparation different degrees of catalyst activity, polymer crystallinity, etc. were obtained.

Table II

| Run No. | A | B | C | D | E |
|---|---|---|---|---|---|
| Catalyst pretreatment: | | | | | |
| AlEt₃/TiCl₄ ratio | 1 | 1 | 0.5 | 0.33 | 0.33. |
| Temperature, °C | 25 | 70 | 100([1]) | 135 [1] | 135 [1]. |
| Time, hours | 0.1 | 1 | 1 | 1 | 1. |
| Diluent | n-Heptane. | n-Heptane. | n-Decane | n-Decane | n-Decane. |
| Analysis of dry catalyst: | | | | | |
| Atoms of— | | | | | |
| Ti | | 1.00 | 1.00 | 1.00 | |
| Al | | 0.16 | 0.183 | 0.33 | |
| Cl | | 3.01 | 3.21 | 3.85 | |
| Color | Lt. brown | Brown | Dark brown | Purple | Purple. |
| X-ray relative crystal | Amorph | Amorph | Slightly crystalline | Crystalline | Crystalline. |
| Surface area, m.²/g | | 257 | | 30.5 | 30.5. |
| Polymerization (Al/Ti=2):[2] | | | | | |
| Diluent | n-Heptane | n-Heptane | n-Heptane | n-Heptane | Xylene. |
| Avg. temperature, °C | 30 | 40 | 40 | 70 | 90. |
| Rate, g./hr./g | 16 | 28 | 35 | 14 | 24. |
| Total heptane insolubles, percent | 35 | 55 | 60 | 63 | 68. |
| Alcohol [3]—Insoluble polymer: | | | | | |
| Mol. wt.×10⁻³ | 51 | 107 | 73 | 120 | 145. |
| Specific gravity, g./cc | 0.865 | 0.872 | 0.887 | 0.879 | 0.885. |
| Tensile, p.s.i. | | 1,570 | 1,980 | 3,640 | 4,650. |
| Elongation, percent | | 130 | 540 | 240 | 25. |
| Softening point, °C | 123 | 140 | 140 | 160 | 160. |
| Melting point, °C | 155 | 153 | 163 | 170 | 173. |

[1] TiCl₄ was added to pretreatment diluent and heated to 80° C. at which time the AlEt₃ (aluminum triethly) was added. The temperature was then rapidly raised to the pretreatment temperature. In all other cases the AlEt₃ was added at pretreatment temp.
[2] Pretreated catalyst was added to the reaction diluent and AlEt₃ presaturated at 10° C. with C₃H₆.
[3] 2/1 mixture of isopropyl alcohol/diluent.

EXAMPLE 3

The importance of using a proper diluent for the catalyst pretreatment is demonstrated by the data in Table III.

Table III

| Run No. | E | F |
|---|---|---|
| Catalyst pretreatment: | | |
| AlEt₃/TiCl₄ ratio | 0.33 | 0.33. |
| Temperature, °C | 135 [1] | 135.[1] |
| Time, hours | 1 | 1. |
| Diluent | n-Decane | Xylene. |
| Analysis of catalyst solids: | | |
| Atoms of— | | |
| Ti | 1.00 | 1.00. |
| Al | 0.33 | 0.06. |
| Cl | 3.85 | 3.08. |
| Color | Purple | Brownish black. |
| X-Ray diffraction pattern | TiCl₃—gamma form. | TiCl₃—beta form. |
| Surface area, m.²/g | 30.5 | 103. |
| Polymerization (Al/Ti=2):[2] | | |
| Diluent | Xylene | Xylene. |
| Av. temp., °C | 90 | 90. |
| Rate, g./hr./g. | 24 | 11. |
| Total heptane insolubles, percent | 68 | 49. |
| Properties of alcohol insoluble polymer:[3] | | |
| Molecular weight×10⁻³ | 145 | 89. |
| Density, g./ml. | 0.885 | 0.873. |
| Elongation, percent | 25 | |
| Tensile strength, p.s.i. | 4,650 | |
| Softening point | 160 | 152. |
| Melting point | 173 | 165. |

[1] TiCl₄ was added to pretreatment diluent and heated to 80° C. at which time the AlEt₃ was added. The temperature was then rapidly raised to the pretreatment teperature. In all other cases the AlEt₃ was added at pretreatment temperature.
[2] Pretreated catalyst was added to the reaction diluent and AlEt₃ presaturated at 10° C. with C₃H₆.
[3] 2/1 mixture of isopropyl alcohol/diluent.

The catalyst prepared in xylene was considerably less active than that one prepared in n-decane in spite of a larger surface area. The catalyst analysis shows that little aluminum was left in the solid catalyst after pretreatment in xylene at 135° C., which may be one reason for its lower activity. Additionally, it is believed that the gamma crystalline form is more active than the beta crystalline form.

EXAMPLE 4

A series of experiments was performed in order to show the critical nature of the mole ratio of the reactants as well as the importance of using a sufficiently high temperature of pretreatment for obtaining a highly stable and crystalline solid catalysts component. The catalyst was prepared by reacting 4.4 m mole (0.85 g.) of VCl₄ in 50 ml. of a suitable diluent (n-heptane or n-decane) with varying amounts of AlEt₃ at 70° C. or 150° C. for 1 hour as shown in Table IV. The pretreated catalyst slurry was then added to a stirred batch reactor containing 950 ml. of n-heptane saturated with propylene at 10° C. and containing the amount of AlEt₃ needed for bringing the Al/Ti mol. ratio of the catalyst system to 2.0. The temperature was then brought up to about 60° C. within one hour under constant stirring and additional propylene was continuously introduced. The polymerization was continued for an additional hour at 58–60° C.

Table IV

POLYMERIZATION OF PROPYLENE WITH SPLIT PRETREATED VCl⁴—AlEt₃ CATALYSTS

[2 l. glass batch unit, 1 l. n-heptane diluent]

| Run No. | G | H | I |
|---|---|---|---|
| Catalyst pretreatment: | | | |
| AlEt₃/VCl₄ ratio | 1 | 0.5 | 0.33. |
| Temperature, °C | 70 | 150 [a] | 150 [a]. |
| Time, hours | 1 | 1 | 1. |
| Diluent | n-Heptane | n-Decane | n-Decane. |
| Polymerization (Al/V=2):[b] | | | |
| Avg. temperature, °C | 47 | 52 | 49. |
| Rate, g./hr./g. | 1.8 | 20.5 | 42.9. |
| Waxy polymer, percent [c] | 14.3 | 9.2 | 1.6. |
| Properties of solid polymer: | | | |
| Mol weight—10⁻³ [d] | 113 | 295 | 200. |
| Density, g./ml. | | | 0.8797. |
| Tensile strength, p.s.i. | | 1,750 | 1,850. |
| Elongation, percent | | 650 | 500. |

[a] VCl₄ was added to the pretreatment diluent and heated to 80° C. at which time the AlEt₃ (aluminum triethyl) was added. The temperature was then rapidly raised to the pretreatment temperature.
[b] Pretreated catalyst was added to the reaction diluent and AlEt₃ presaturated at 10° C. with C₃H₆.
[c] Semi-amorphous polymer remaining in solution at 50° C. after 2 volumes of isopropanol had been added to precipitate the solid polymer.
[d] According to the Harris Correlation (J. Polymer Science, 8, 361 (1952)).

It can be seen from Run G compared to Runs H and I in Table IV that pretreatment at 70° C. even at an Al/Ti mole ratio of 1.0 yields a much less active and more unstable catalyst than pretreatment at 150° C. Pretreatment at a lower Al/Ti ratio than 1.0 at 70° C. gives even a less active catalyst.

The importance of using a mole ratio between AlEt₃ and VCl₄ of about 0.33 when pretreating at a temperature at which all the alkyl groups of the AlEt₃ may take part in the reduction is shown in runs H and I. An increase of this ratio from 0.33, which is the stoichiometric ratio, to 0.5 results in a decrease in polymerization rate from 42.9 g./hr./g. to 20.5 g./hr./g.

EXAMPLE 5

The importance of using a sufficiently high temperature of pretreatment for obtaining a crystalline and highly stable solid catalyst component was further demonstrated in the series of runs recorded in Table V. The catalysts were pretreated according to the method described in Example 4 and at the Al/Ti mol. ratios and temperatures indicated in Table V. The polymerizations were then carried out isothermally at 60° C. for 2 hours in 1 l. of xylene diluent using the same equipment and general procedure as described in Example 4.

*Table V*

POLYMERIZATION OF PROPYLENE WITH SPLIT PRETREATED VCl₄—AlEt₃ CATALYSTS

[2 l. glass batch unit, 1 l. xylene diluent]

| Run No. | J | K | L |
|---|---|---|---|
| Catalyst pretreatment: | | | |
| VCl₄, g | 0.85 | 0.85 | 0.85. |
| AlEt₃, g | 0.5 | 0.25 | 0.17. |
| Al/V ratio | 1 | 0.5 | 0.33. |
| Temperature, °C | 70 | 100 [a] | 150 [a]. |
| Time, hours | 1 | 1 | 1. |
| Diluent | n-Heptane | n-Decane | n-Decane. |
| Reaction conditions: | | | |
| AlEt₃ separately added, g | 0.5 | 0.75 | 0.83 |
| Al/V ratio | 2 | 2 | 2. |
| Avg. polym. temp., °C | 60 | 60 | 60. |
| Run length, hours | 2 | 2 | 2. |
| Results: | | | |
| Max. absorption rate, ml./g./min | 0 | 540 | 810. |
| Polymer yield, g | 1.9 | 31.9 | 82.1. |
| Waxy polymer, percent [b] | 10.5 | 5.6 | 2.2. |
| Catalyst efficiency, g./g | 1.0 | 17.2 | 44.4. |
| Properties of solid polymer: | | | |
| Mol. weight×10⁻³ [c] | 170 | 290 | 200. |
| Density, g./ml | | 0.8838 | 0.8843. |
| Soft. pt./M.P., °C | | 150/156 | 157/162. |

[a] VCl₄ was added to the pretreatment diluent and heated to 80° C. at which time the AlEt₃ (aluminum triethyl) was added. The temperature was then rapidly raised to the pretreatment temperature.
[b] Semi-amorphous polymer remaining in solution at 50° C. after 2 volumes of isopropanol had been added to precipitate the solid polymer.
[c] According to the Harris Correlation (J. Polymer Science, 8, 361, 1952)).

The polymer yields, for catalysts pretreated at 70° C., 100° C., and 150° C. were 1.9 g., 31.9 g., and 82.1 g., respectively, proving that increasing temperatures of pretreatment resulted in improved catalysts within the temperature range tested. The higher crystallinity of the catalysts prepared at higher temperatures was clearly demonstrated by the formation of less amorphous ("waxy") polymer with the 150° C. preparation (2.2%) than with the 100° C. and 70° C. preparations (5.6% and 10.5%, respectively).

EXAMPLE 6

Two experiments were performed which showed that a highly crystalline and stable solid TiCl₃ catalyst component capable of polymerizing propylene to a polymer of good properties can be prepared by using a dialkyl aluminum halide as the reducing agent at the preferred Al/Ti ratio previously described. In Table VI, Run M, AlEt₂F was used both as reducing agent in the split pretreatment and as activator in the subsequent polymerization, whereas in Run N, AlEt₂F was used only as the reducing agent and AlEt₃ as the activator. The split pretreatment was carried out at 150° C. essentially as described in Example 4. The polymerizations were carried out isothermally at 75° C. for 2 hours in 1 l. of a 9/1 xylene/n-decane diluent using the same equipment and general procedure as described in Example 4.

Polypropylene of good physical properties was obtained in both experiments. However, the yield was much higher when AlEt₃ was used as the activator. In this case, Run N, a polymer of unusually high crystallinity (density= 0.9009 g./ml. with only 0.4% waxy polymer being rejected) was obtained at a good rate. This proves that a highly crystalline catalyst component can be obtained according to the method of this invention using an alkyl aluminum halide as the reducing agent. It also demonstrates the superiority of aluminum trialkyls as activators for the subsequent polymerization reaction.

*Table VI*

POLYMERIZATION OF PROPYLENE WITH SPLIT PRETREATED TiCl₄—AlEt₂F CATALYSTS

[2 l. glass batch unit, 900 ml. xylene and 100 ml. n-decane as diluent]

| Run No. | M | N |
|---|---|---|
| Catalyst pretreatment: | | |
| TiCl₄, g | 1.90 | 1.90. |
| AlEt₂F, g | 0.52 | 0.52. |
| Al/Ti ratio | 0.5 | 0.5. |
| Temperature, °C | 150 [a] | 150 [a]. |
| Time, hours | 1 | 1. |
| Diluent | n-Decane | n-Decane. |
| Reaction conditions: | | |
| Al alkyl separately added: | | |
| Type | AlEt₂F | AlEt₃. |
| Weight, g | 1.56 | 1.71. |
| Al/Ti ratio | 2 | 2. |
| Polymerization temperature, °C | 75 | 75. |
| Run length, hours | 2 | 2. |
| Results: | | |
| Max. absorption rate, ml./g./min | 55 | 200. |
| Polymer yield, g | 9.0 | 50.9. |
| Waxy polymer, percent [b] | 5.6 | 0.4. |
| Catalyst efficiency, g./g | 2.26 | 12.3. |
| Properties of solid polymer: | | |
| Mol. weight×10⁻³ [c] | 270 | 155. |
| Density, g./ml | 0.8976 | 0.9009. |
| M.P., °C | 161 | 164. |

[a] TiCl₄ was added to the pretreatment diluent and heated to 80° C. at which time the AlEt₂F (diethyl aluminum fluoride) was added. The temperature was then rapidly raised to the pretreatment temperature.
[b] Semi-amorphous polymer remaining in solution at 50° C. after 2 volumes of isopropanol had been added to precipitate the solid polymer.
[c] According to the Harris Correlation (J. Polymer Science, 8, 361, (1952)).

Although the catalyst preparations in the examples were done batchwise and were used in batch runs it is obviously within the scope of this invention to utilize batch preparations in continuous polymerizations or to accomplish the batch type preparation by pretreating in two stages or in pipe flow to obtain the effect of batch pretreatment. The invention is not to be limited to the specific examples given. The relative proportions of the materials used and the reaction conditions may be varied within the limits indicated in the specification to obtain products of varying characteristics.

What is claimed is:

1. A process for preparing a crystalline catalyst material which comprises reacting a heavy transition metal halide of a metal selected from groups IV and V of the periodic table with an aluminum alkyl at a temperature in the range of 120–200° C. for a period of time from about 5 minutes to 20 hours to reduce the metal compound to its next lower valence; the mol ratio of aluminum alkyl to metal halide being in the range of 0.30/1 to 0.36/1 when said aluminum alkyl contains three active alkyl groups, the ratio being about 0.5/1 when said aluminum alkyl contains two active alkyl groups, and said ratio being about 1/1 when said aluminum alkyl contains one active alkyl group.

2. The process of claim 1 wherein said heavy transition metal halide is titanium tetrachloride and said reducing metal-containing material is triethyl aluminum.

3. The process of claim 1 wherein said heavy transition metal halide is vanadium tetrachloride.

4. The process of claim 1 wherein the temperature is in the range of about 120 to 200° C. and the period of time is in the range of 20 minutes to 2 hours.

5. The process of claim 1 wherein one mole of titanium tetrachloride is reached with about 0.5 mole of dialkyl aluminum halide.

6. The process of claim 1 wherein one mole of vanadium tetrachloride is reacted with about 0.5 mole of dialkyl aluminum halide.

7. The process of claim 2 wherein the ratio of triethyl aluminum to titanium tetrachloride is about 0.33/1.

8. A process of preparing a crystalline catalyst intermediate comprising reacting one mole of titanium tetrachloride with about 0.33 mole of trialkyl aluminum in the presence of an inert liquid diluent, heating the reaction product to a temperature in the range of about 135 to 175° C. for from about 20 minutes to 2 hours to reduce the titanium tetrachloride to crystalline titanium trichloride.

9. The process for preparing crystalline catalyst intermediate comprising reacting of one mole of vanadium tetrachloride with about 0.33 mole of trialkyl aluminum in the presence of an inert liquid diluent, heating the reaction product to a temperature in the range of about 135–175° C. for from about 20 minutes to 2 hours to reduce the vanaduim tetrachloride to form said crystalline catalyst intermediate.

References Cited in the file of this patent

UNITED STATES PATENTS

| | | |
|---|---|---|
| 2,839,518 | Brebner | June 17, 1958 |
| 2,874,153 | Bowman | Feb. 7, 1959 |
| 2,893,984 | Seelbach et al. | July 7, 1959 |